W. R. BOERNER.
Motor.
No. 233,319.  Patented Oct, 19, 1880.
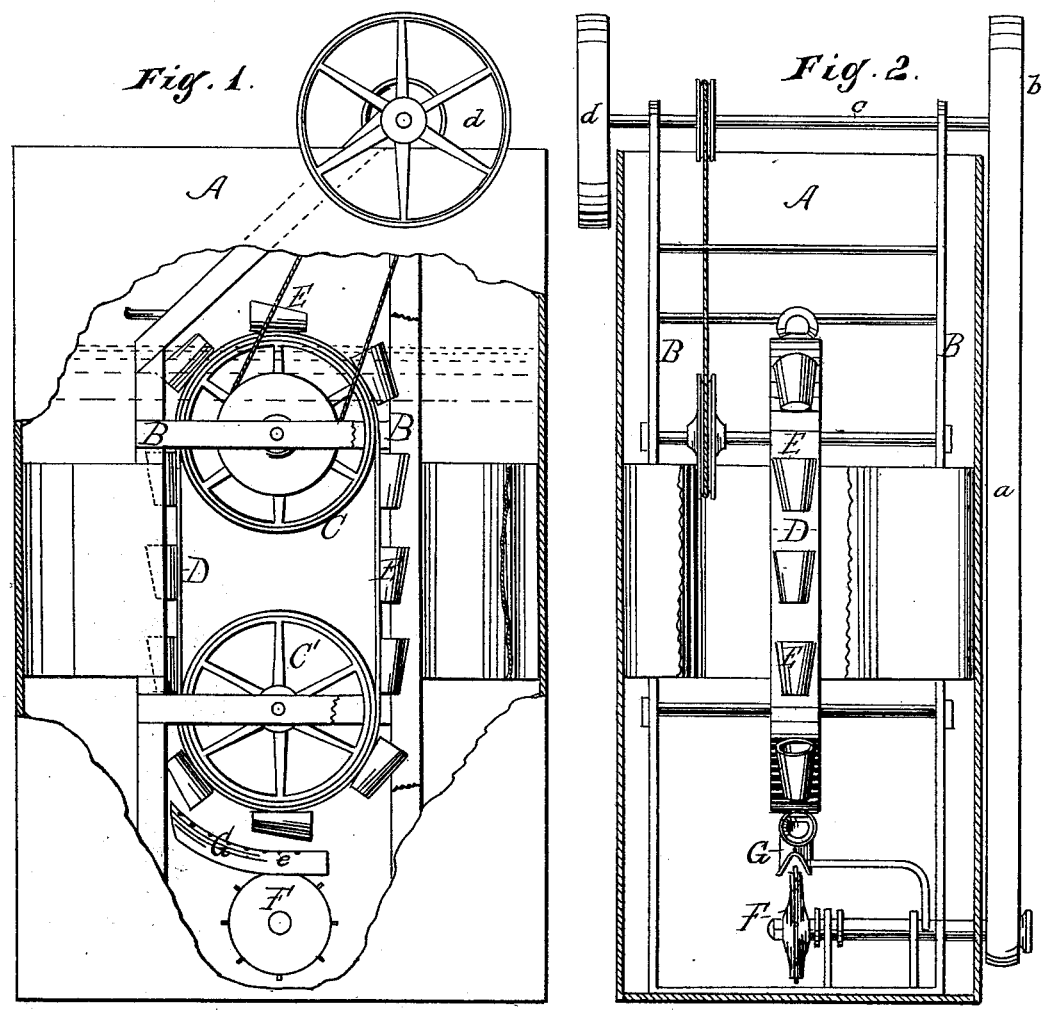
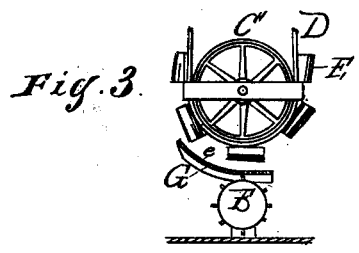
Witnesses:
Rich<sup>d</sup> N. Dyer.
Emil N. Frommann
Inventor:
Wunibald R. Boerner
By Wm H. Lotz
Attorney

UNITED STATES PATENT OFFICE.

WUNIBALD R. BOERNER, OF CHICAGO, ILLINOIS.

MOTOR.

SPECIFICATION forming part of Letters Patent No. 233,319, dated October 19, 1880.

Application filed February 3, 1880.

*To all whom it may concern:*

Be it known that I, WUNIBALD R. BOERNER, of Chicago, in the county of Cook and State of Illinois, have invented a certain new and useful Improvement in Motors, of which the following is a specification.

The object I have in view is to produce a cheap and simple motive power for driving machinery; and my invention consists in the devices hereinafter described and claimed for utilizing the lifting power of atmospheric air in water.

In the accompanying drawings, forming a part hereof, Figure 1 is an elevation of the preferred form of the machine with the water-tank and a part of the frame-work broken away to show the parts; Fig. 2, a similar view from another side of the machine, and Fig. 3 an elevation of the submerged pump.

Like letters denote corresponding parts in all three figures.

A is the water-tank, and B the frame-work of the machine, placed within the tank.

C C' are two belt or chain wheels mounted in the frame, one above the other, and carrying the endless belt or chain D, upon which are secured the buckets E. These buckets are of suitable construction, and are all arranged with their open ends or mouths in the same direction, so that the buckets on one side of the chain will present their mouths downward to catch the rising air.

F is a centrifugal air-pump submerged in the water, and situated beneath the buckets. It has a hollow shaft through which the air is drawn, and is run in any suitable manner.

A collecting and guiding shield, G, with perforations $e$, is arranged above the pump, and serves the purpose of collecting the air and directing it into the open mouths of the buckets.

The air being pumped into the body of water rises into the buckets and displaces the water. These buckets thus become specifically lighter than those on the opposite side of the chain or belt, and consequently the belt or chain moves and revolves the wheels C C', either one (or both) of which is connected in any suitable manner with the machinery to be driven. As the buckets reach the upper wheel they turn, and the air escapes.

It is obvious that instead of using a water-tank the machine could be submerged in the water of rivers or lakes.

The buckets can be replaced by a submerged turbine, to be revolved by the upwardly-rising air or by other mechanical means, for catching the air and utilizing its power.

The construction of the submerged pump is not an essential feature.

I am aware that it has been attempted to use steam by allowing it to escape into a body of water and utilizing its lifting power by chain-buckets; but steam is not economical for this purpose on account of the first cost of generating the steam and the great loss by condensation in the body of water.

What I claim as my invention is—

The motor described, wherein are combined chain-buckets and carrying-wheels, which transmit the power submerged in water, and a submerged air-pump below such buckets or wings, substantially as and for the purpose set forth.

WUNIBALD R. BOERNER.

Witnesses:
RICHD. N. DYER,
OLIVER W. MARBLE.